United States Patent
Chestnutt et al.

(10) Patent No.: US 6,492,447 B2
(45) Date of Patent: Dec. 10, 2002

(54) PROCESS FOR PRODUCING HIGH QUALITY NATURAL RUBBER

(75) Inventors: Lee Craig Chestnutt, Sumatera Utara (ID); Adam Christian Quentin James, Singapore (SG)

(73) Assignee: The Goodyear Tire & Rubber Company, Akron, OH (US)

( * ) Notice: Subject to any disclaimer, the term of this patent is extended or adjusted under 35 U.S.C. 154(b) by 218 days.

(21) Appl. No.: 09/751,770

(22) Filed: Dec. 29, 2000

(65) Prior Publication Data

US 2001/0049411 A1 Dec. 6, 2001

Related U.S. Application Data

(60) Provisional application No. 60/173,697, filed on Dec. 30, 1999.

(51) Int. Cl.⁷ ............................ C08G 63/89; C08G 63/90
(52) U.S. Cl. .................. 524/157; 525/54.45; 525/192; 525/197; 525/54.4; 524/528
(58) Field of Search .......................... 525/54.4, 54.45, 525/192, 19; 524/157

(56) References Cited

U.S. PATENT DOCUMENTS

| | | | | |
|---|---|---|---|---|
| 4,062,906 A | * | 12/1977 | Knight | 524/202 |
| 5,017,630 A | * | 5/1991 | Raines et al. | 523/334 |
| 5,998,531 A | * | 12/1999 | Aimura et al. | 524/495 |
| 6,054,525 A | * | 4/2000 | Schloman et al. | 524/575.5 |

FOREIGN PATENT DOCUMENTS

| | | | |
|---|---|---|---|
| GB | 1122463 | * | 8/1968 |

* cited by examiner

Primary Examiner—David W. Wu
Assistant Examiner—R. Harlan
(74) Attorney, Agent, or Firm—Alvin T. Rockhill

(57) ABSTRACT

This invention relates to a technique for making a high quality natural rubber composition having a dirt content of less than 0.03 percent and a constant Mooney viscosity of 60 by blending up to 60 weight percent cup-lump rubber with natural rubber made by coagulating natural rubber latex This process comprises: (1) removing foreign material from the cup-lump rubber to produce cleaned cup-lump rubber; (2) reducing the particle size of the cleaned cup-lump rubber to an average particle size of less than 35 millimeters; (3) coagulating the natural rubber latex to produce latex rubber coagulum; (4) mixing the cleaned cup-lump rubber with the latex rubber coagulum to produce a blend of cup-lump rubber and latex rubber coagulum, wherein a maximum of 60 percent by weight of the cup-lump rubber is mixed into the blend; (5) reducing the particle size of the blend of cup-lump rubber and latex rubber coagulum to a maximum particle size of 3 millimeters to produce a small particle size rubber blend; (6) conveying the small particle size rubber blend in an air medium through a pneumatic transfer system; (7) mixing about 0.1 weight percent to about 0.2 weight percent of an antioxidant into the small particle size rubber blend as its being conveyed in the air medium through the pneumatic transfer system; (8) transferring the small particle size rubber blend in the air medium into a gas-cyclone; and (9) separating the air from the small particle size rubber blend to produce the high quality natural rubber composition.

6 Claims, No Drawings

PROCESS FOR PRODUCING HIGH QUALITY NATURAL RUBBER

This Application claims the benefit of No. 60/173,697, filed Dec. 30,1999.

BACKGROUND OF THE INVENTION

Natural rubber is produced by a wide variety of plant species. For instance, Guayule rubber is produced by *Parthenium argentatum* which is a shrub found in Mexico and the southwestern part of the United States. However, natural rubber is cultivated on a commercial basis almost exclusively from *Hevea brasiliensis* which is a tree that is indigenous to Brazil. *Hevea brasiliensis* trees grow only within the tropics and subtropics where frost is never encountered and where heavy annual rainfalls occur. In fact, *Hevea brasiliensis* trees are typically cultivated only within a latitude of 15° of the equator.

Today, most natural rubber comes from rubber plantations where *Hevea brasiliensis* trees (rubber trees) are cultivated. The rubber is present in latex which is an emulsion or dispersion of rubber in water produced by the trees. The rubber latex occurs in the bark of the rubber trees in tubes or ducts which spiral from left to right as they ascend the trees. The latex is tapped from the rubber trees about every other day. This is done by making a spiral cut downward from left to right at an angle of about 30° for half of the circumference of the tree. The cut is made almost, but not completely, through the bark. In any case, the cut is deep enough to pierce the latex tubes or ducts which allows the latex to flow through the cut to a spout that is inserted at the lowest part of the cut. The spout is situated in a manner that directs the flow of latex into a collection cup.

Each tapping yields about a cup of latex that contains approximately 30 percent (about 50 grams) of natural rubber. Each subsequent cut in the tapping process in made immediately below the preceding cut. It is a common practice to rest the rubber trees after periods of heavy tapping.

Some of the latex collected by the tapping process is concentrated to a solids content of about 60 percent and sold as natural rubber latex. Such natural rubber latex is used in manufacturing dipped goods, such as rubber gloves and prophylactics. However, most of the latex collected is coagulated into dry rubber. This is typically done by straining the latex through a sieve to remove particles of bark and dirt and then diluting the latex with clean water to a solids content of about 15 percent. Then, the diluted latex is coagulated by the addition of formic acid or acetic acid. The rubber crumbs generated by the coagulation are then washed, dried and compacted into blocks for shipping. Such natural rubber made by the coagulation of latex is of high quality and is typically classified as SIR3 CV-60 (maximum dirt content of 0.03 percent and constant Mooney viscosity of 60).

In actual practice, about 20 percent of the latex tapped from rubber trees coagulates in the collection cups. This is known as cup-lump rubber because it naturally coagulates and forms a lump in the collection cup. Cup-lump rubber is also sometimes referred to as "tree lace" because it can also coagulate into strips which can be removed from the cuts in the tree's bark. A small amount of preservative, such as sodium sulfite, is frequently added to the collection cup to inhibit coagulation. However, the use of such preservatives does not eliminate the generation of cup-lump rubber. Since cup-lump rubber has an unknown viscosity and inherently contains a high level of impurities, such as bark, leaves, insects, silt, sand, dirt and other contaminates, it is of much lower commercial value. Cup-lump rubber is typically classified as SIR20 VK (maximum dirt content of 0.20 percent and unknown viscosity).

In some cases, cup-lump rubber is blended with high quality SIR3 CV-60 rubber to make a rubber blend of an intermediate grade. For instance, cup-lump rubber is commonly blended with SIR3 CV-60 rubber to make a blend designated as SIR5 CV-60 which has a maximum dirt content of 0.05 percent and a constant viscosity of 60. However, it has heretofore not been possible to make high quality SIR3 CV-60 rubber with blends containing significant quantities of cup-lump rubber.

SUMMARY OF THE INVENTION

This invention relates to a technique for making a high quality natural rubber composition having a dirt content of less than 0.03 percent and a constant Mooney viscosity of 60 by blending cup-lump rubber with natural rubber made by coagulating natural rubber latex. The high quality natural rubber composition of this invention can be made with up to 60 percent cup-lump rubber.

This invention more specifically discloses a process for producing a high quality natural rubber composition from a feed stream that is comprised of natural rubber latex and cup-lump rubber which comprises:

(1) removing foreign material from the cup-lump rubber to produce cleaned cup-lump rubber;

(2) reducing the particle size of the cleaned cup-lump rubber to an average particle size of less than 35 millimeters;

(3) coagulating the natural rubber latex to produce latex rubber coagulum;

(4) mixing the cleaned cup-lump rubber with the latex rubber coagulum to produce a blend of cup-lump rubber and latex rubber coagulum, wherein a maximum of 60 percent by weight of the cup-lump rubber is mixed into the blend;

(5) reducing the particle size of the blend of cup-lump rubber and latex rubber coagulum to a maximum particle size of 3 millimeters to produce a small particle size rubber blend;

(6) conveying the small particle size rubber blend in an air medium through a pneumatic transfer system;

(7) mixing about 0.1 weight percent to about 0.2 weight percent of an antioxidant into the small particle size rubber blend as its being conveyed in the air medium through the pneumatic transfer system;

(8) transferring the small particle size rubber blend in the air medium into a gas-cyclone; and (9) separating the air from the small particle size rubber blend to produce the high quality natural rubber composition.

DETAILED DESCRIPTION OF THE INVENTION

The cup-lump rubber used in the process of this invention is collected on the plantation in the normal way. After being collected, the cup-lump rubber is then cleaned to remove foreign matter, such as dirt, sand, bark, leaves, insects, silt and other contaminants. This can be accomplished by washing the cup-lump rubber with clean water. For instance, the clean water can be sprayed onto the cup-lump rubber or the cup-lump rubber can be emersed into a vessel containing water. The cup-lump rubber can also be separated from dirt and other impurities by use of a hydrocyclone. After being washed, the cup-lump rubber will normally be dried.

The cleaned cup-lump rubber will then be reduced in particle size to an average particle size of less than 35 millimeters. This can be accomplished by mechanically grinding the cleaned cup-lump rubber. Any equipment that is capable of reducing the particle size of the cleaned cup-lump rubber to an average particle size of less than 35 millimeters can be used.

Natural rubber latex is coagulated into latex rubber coagulum and subsequently used in making the high quality natural rubber compositions of this invention. The natural rubber latex collected from rubber trees typically has a solids content of about 30 percent. The latex is normally filtered through a sieve or screen to remove large contaminants, such as bark, leaves and insects, and is then diluted with clean water to a solids content which is the range of about 10 to about 25 percent. The natural rubber latex is preferably diluted to a solids content which is within the range of about 12 percent to about 18 percent.

After optionally being diluted, the natural rubber latex is coagulated by the addition of formic acid and/or acetic acid. This results in solid natural rubber particles separating from the aqueous phase. The latex rubber coagulum (solid natural rubber particles) can then be recovered from the aqueous phase, optionally, washed in clean water, and then dried.

The cleaned cup-lump rubber is then mixed with the latex rubber coagulum to make a blend of cup-lump rubber and latex rubber coagulum. A maximum of 60 weight percent cup-lump rubber should be included in the blend (based upon the total weight of the cup-lump rubber and the latex rubber coagulum included in the blend). It has been found that, if more than about 60 weight percent cup-lump rubber is included in the blend, the properties of the high quality natural rubber composition being made are sacrificed. Excellent results can be obtained by blending low levels of cup-lump rubber with the latex rubber coagulum. However, in cases where extremely low levels of cup-lump rubber are included in the blend, relatively large quantities of latex rubber coagulum are consumed with only a small amount of cup-lump rubber being used. For practical reasons, at least about 10 weight percent cup-lump rubber will be included in the blend with latex rubber coagulum. In most cases, the blend will contain from about 20 weight percent to about 55 weight percent cup-lump rubber and from about 45 weight percent to about 80 weight percent latex rubber coagulum. It is more typical for the blend to contain from about 30 weight percent to about 50 weight percent cup-lump rubber and from about 50 weight percent to about 70 weight percent latex rubber coagulum. It is normally preferred for the blend to contain from about 35 weight percent to about 45 weight percent cup-lump rubber and from about 55 weight percent to about 65 weight percent latex rubber coagulum.

The particle size of the blend of cup-lump rubber and latex rubber coagulum is then reduced to a maximum average particle size of 3 millimeters. This can be accomplished by mechanically grinding the blend of cup-lump rubber and latex rubber coagulum. Any equipment that is capable of producing a small particle size blend by reducing the particle size of the blend to an average particle size of no more than 3 millimeters can be used.

The small particle size rubber blend is then conveyed through a pneumatic transfer system. The small particle size rubber blend can be introduced into the pneumatic transfer system through a venturi. In such systems having a venturi design, the small particle size rubber blend is fed into a pipeline through a small tube (the venturi) that is inserted into the pipeline. The venturi has flaring ends connected by a constricted middle section and depends for operation on the fact that, as the velocity of air flow in the pipe increases in the constricted part, a suction is produced that pulls the small particle size rubber into the pipe through the venturi. The air flowing through the pipe into which the venturi is inserted will have a small amount of an antioxidant dispersed therein. Thus, an antioxidant is dispersed into the small particle size rubber being conveyed through the pneumatic transfer system.

In any case, from about 0.1 weight percent to about 0.2 weight percent of an antioxidant is mixed into the small particle size rubber as it is being conveyed through the pneumatic transfer system. In most cases, from about 0.12 weight percent to about 0.18 weight percent of the antioxidant is mixed into the small particle size rubber as it is being conveyed through the pneumatic transfer system.

A wide variety of antioxidants can be used. For instance, the antioxidant used can be of the secondary amine, phenolic or phosphite type. More specifically, the antioxidant can be a phenylnaphthylamine, a diphenylamine, a para alkoxy substituted diphenylamine, a para alkenoxy substituted diphenylamine, a para alkylated diphenylamine, a styrenated phenol or an alkylated diphenolic. Some representative examples of antioxidants that can be used include Wingstay® L hydroxyl amine sulfite, Wingstay® 100 mixed diaryl-p-phenylenediamine, Agerite Geltrol modified high molecular weight hindered phenol and Agerite White dibetanaphthyl-p-phenylenediamine.

After the antioxidant has been mixed into the small particle size rubber, it is further conveyed through the pneumatic transfer system into a gas cyclone. The small particle size rubber containing the antioxidant is then separated from the air stream from the pneumatic transfer system to produce the high quality natural rubber composition. The high quality natural rubber composition has a dirt content of less than 0.03 percent and a constant Mooney viscosity of about 60 (within the range of about 50 to about 70).

This invention is illustrated by the following example which is merely for the purpose of illustration and is not to be regarded as limiting the scope of the invention or the manner in which it can be practiced. Unless specifically indicated otherwise, parts and percentages are given by weight.

EXAMPLE

Cup-lump rubber was collected from *Hevea brasiliensis* trees on a rubber plantation. Foreign matter was removed from the cup-lump rubber by washing it with clean water. The cup-lump rubber was then dried and ground to an average particle size of less than 35 millimeters. Then, 50 parts of the ground cup-lump rubber was mixed with 50 parts of latex rubber coagulum. The latex rubber coagulum was made by coagulating natural rubber latex with formic acid.

The blend of cup-lump rubber and latex rubber coagulum was then ground to a particle size of about 3 millimeters. The ground rubber blend was then fed into a pneumatic transfer system through a venturi tube. The air flowing through the pneumatic system contained about 0.15 weight percent Wingstay® L hydroxyl amine sulfite antioxidant, based upon the weight of the ground rubber blend. Thus, the antioxidant was mixed throughout the rubber blend. The rubber containing the antioxidant was then recovered from the air stream in a gas cyclone.

The natural rubber recovered was determined to have a dirt content of less than 0.03 percent and a constant Mooney viscosity of about 60. In fact, the high quality natural rubber composition made was classified as SIR3 CV-60. Thus, the technique of this invention can be used to make cup-lump rubber into a natural rubber composition of much higher quality and much higher value than has heretofore been possible.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. A process for producing a high quality natural rubber composition from a feed stream that is comprised of natural rubber latex and cup-lump rubber which comprises:

(1) removing foreign material from the cup-lump rubber to produce cleaned cup-lump rubber;

(2) reducing the particle size of the cleaned cup-lump rubber to an average particle size of less than 35 millimeters;

(3) coagulating the natural rubber latex to produce latex rubber coagulum;

(4) mixing the cleaned cup-lump rubber with the latex rubber coagulum to produce a blend of cup-lump rubber and latex rubber coagulum, wherein a maximum of 60 percent by weight of the cup-lump rubber is mixed into the blend;

(5) reducing the particle size of the blend of cup-lump rubber and latex rubber coagulum to a maximum particle size of 3 millimeters to produce a small particle size rubber blend;

(6) conveying the small particle size rubber blend in an air medium through a pneumatic transfer system;

(7) mixing about 0.1 weight percent to about 0.2 weight percent of an antioxidant into the small particle size rubber blend as its being conveyed in the air medium through the pneumatic transfer system;

(8) transferring the small particle size rubber blend in the air medium into a gas-cyclone; and (9) separating the air from the small particle size rubber blend to produce the high quality natural rubber composition.

2. A process as specified in claim 1 wherein the antioxidant is hydroxyl amine sulfite.

3. A process as specified in claim 1 wherein at least 10 weight percent of the cleaned cup-lump rubber is mixed with the latex rubber coagulum in step (4).

4. A process as specified in claim 1 wherein 20 weight percent to about 55 weight percent of the cleaned cup-lump rubber is mixed with about 45 weight percent to about 80 weight percent of the latex rubber coagulum in step (4).

5. A process as specified in claim 1 wherein 30 weight percent to about 50 weight percent of the cleaned cup-lump rubber is mixed with about 50 weight percent to about 70 weight percent of the latex rubber coagulum in step (4).

6. A process as specified in claim 1 wherein 35 weight percent to about 45 weight percent of the cleaned cup-lump rubber is mixed with about 55 weight percent to about 65 weight percent of the latex rubber coagulum in step (4).

* * * * *